J. B. WIARD.
DYNAMO ELECTRIC MACHINE.
APPLICATION FILED DEC. 6, 1905.

943,503.

Patented Dec. 14, 1909.
2 SHEETS—SHEET 1.

WITNESSES:
George A. Thornton
Helen Oxford

INVENTOR:
John B. Wiard,
By Albert G. Davis
Att'y.

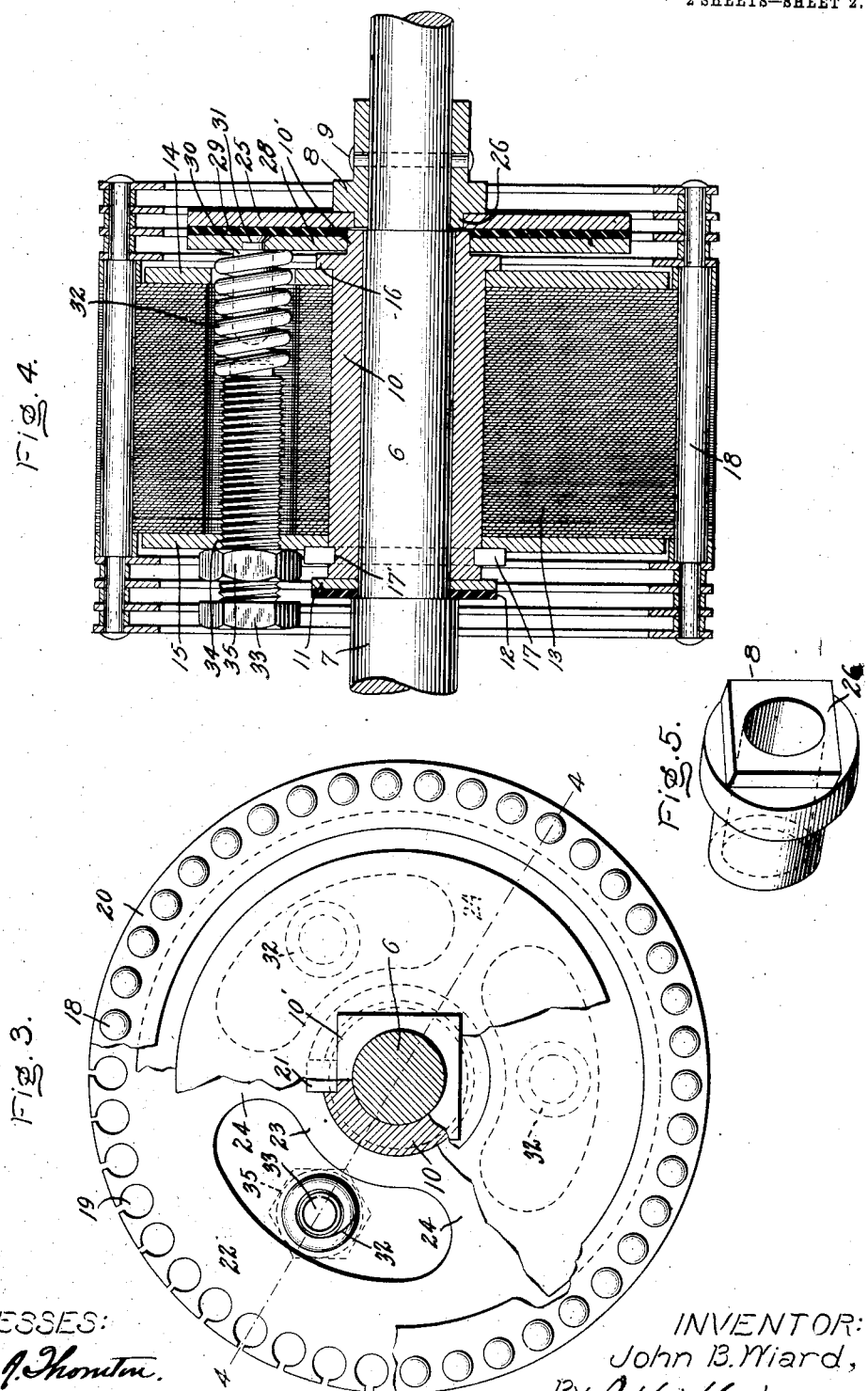

UNITED STATES PATENT OFFICE.

JOHN B. WIARD, OF LYNN, MASSACHUSETTS, ASSIGNOR TO GENERAL ELECTRIC COMPANY, A CORPORATION OF NEW YORK.

DYNAMO-ELECTRIC MACHINE.

943,503. Specification of Letters Patent. Patented Dec. 14, 1909.

Application filed December 6, 1905. Serial No. 290,560.

*To all whom it may concern:*

Be it known that I, JOHN B. WIARD, a citizen of the United States, residing at Lynn, county of Essex, State of Massachusetts, have invented certain new and useful Improvements in Dynamo-Electric Machines, of which the following is a specification.

In the operation of certain classes of machinery by electric motors, difficulties have sometimes been experienced on account of the unyielding nature of the connection ordinarily employed between the rotating member of the motor and the machinery driven. For instance, with electrically driven loom machinery in cloth mills, the shock caused by the inertia of the moving member of the motor when the loom mechanism suddenly stops or is broken, is very disadvantageous. To avoid the injuries arising from such shocks, I have devised a simple and effective mechanism for connecting the rotating body proper of the motor to its shaft, which will yield, substantially without shock, when a retarding action is exerted on the shaft, slightly greater than that of the normal load.

While the mechanism which I have devised is particularly useful for connecting the rotating body of an electric motor to its shaft for the purposes mentioned, it is generally useful wherever it is desired to connect the body of the rotating member of a dynamo electric machine to its shaft by a yielding connection.

The various features of novelty which characterize my invention are pointed out with particularity in the claims annexed to and forming a part of this specification. For a better understanding of my invention, however, reference may be had to the accompanying drawings and descriptive matter in which I have described and illustrated one of the forms in which it may be embodied.

Figure 2:
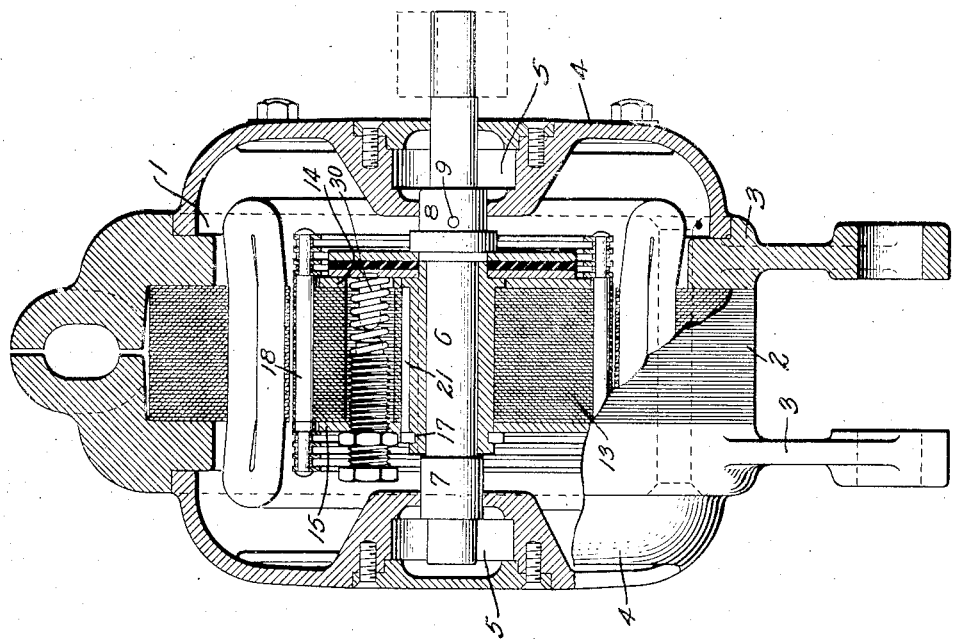
Figure 1:
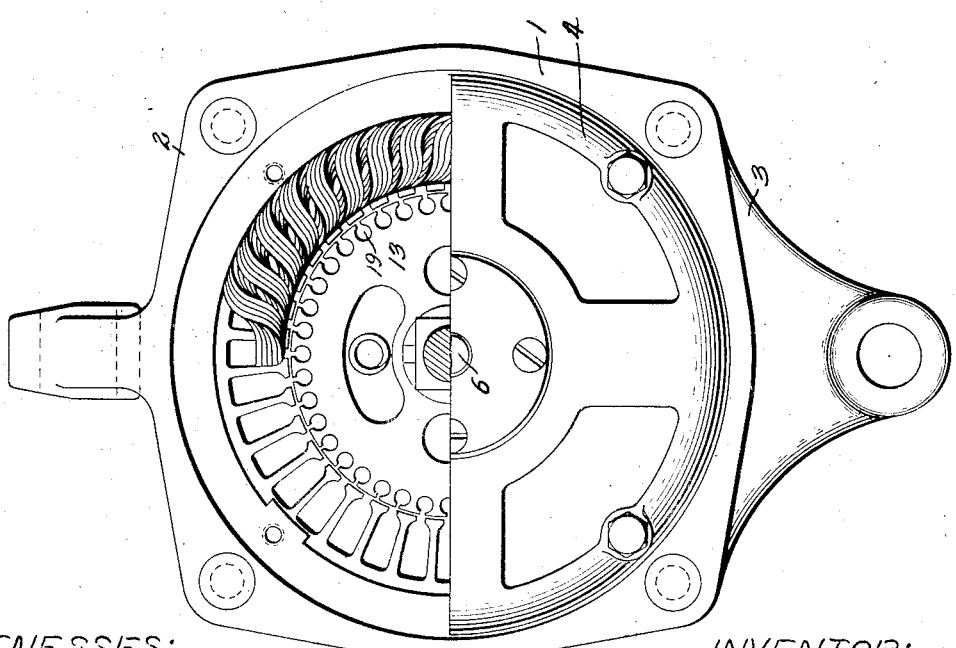

Of the drawings, Figure 1 is an end elevation of an electric motor equipped with my invention with parts broken away; Fig. 2 is a view at right angles to Fig. 1 partly broken away and partly in section; Fig. 3 is an end elevation of the rotating member of the motor with parts broken away and in section; Fig. 4 is a section on the line 4 4 of Fig. 3; and Fig. 5 is a perspective view of a detail.

In the drawings, 1 represents the stator or stationary member of an induction motor, comprising a laminated core 2, and frame members 3, between which the core is held by rivets and to which are bolted end members or bonnets 4 provided with bearing boxes 5 in which the shaft 6 of the rotor or rotating member of the motor is journaled.

The rotor shaft 6 is formed with an enlargement or collar 7 which may be integral with the shaft and at some distance therefrom is provided with a collar 8 which may be detachably secured to the shaft by a pin 9. The rotor body comprises a cylindrical sleeve 10 loosely mounted on the shaft 6 between the collars 7 and 8. A washer 11 of steel and a washer 12 which may be formed of hard fiber or the like surrounding the shaft 6 may be placed between the collar 7 and the adjacent end of the sleeve 10. The laminated core 13 of the rotor is assembled between end members 14 and 15 and the whole is held between an integral collar 16 on the sleeve 10 and a detachable collar or annular key 17 removably secured in an annular depression or groove 17' in the sleeve. The winding on the rotor may be of the ordinary squirrel cage type comprising bars or rods 18 inserted in slots 19 in the laminated core and annular end connections 20. The laminæ and the end members are prevented from turning on the collar by means of the key 21.

As shown the laminated core of the rotor comprises an annular portion 22, a hub portion 23, and three spoke or arm portions 24. A friction member in the form of a disk 25 is secured to the shaft 6. In the particular construction shown the disk 25 is formed with a centrally located square opening which fits the squared inner end 26 of the collar 8 and bears against a shoulder or rib formed on the collar 8.

A coöperating friction member in the form of a disk 28 having a centrally located square aperture is mounted on the end 10' of the sleeve 10 adjacent the collar 8. This end of the sleeve 10 is squared to fit the aperture in the friction member. The disk 28 is movable axially with respect to the sleeve 10, but is prevented from rotatable movement with respect thereto by the shape of the aperture in the disk and the portion of the sleeve entering it. Between the friction members 25 and 28 which may advantageously be formed of sheet steel or the like is placed a washer 29 of suitable material such as hard fiber.

In the construction shown in the drawings three equally spaced posts or members 30 are secured to the inner face of the friction member 28 by means of screws 31. The members 30 extend into the corresponding chambers or channels formed in the core. Three helical springs 32 are also located in the channels in the core, one spring surrounding each member 30 with one end in engagement with the inner surfaces of the friction member 28. The opposite ends of the springs are engaged by the ends of threaded bolts 33 which pass through threaded openings 34 formed to receive them in the end member 15. Lock nuts 35 are employed to secure the bolts at any desired position relative to the end member 15.

By properly adjusting the tension of the springs 32 which is accomplished by rotation of the bolts 33 in their threaded passages 34 in the member 15, the pressure applied to the opposite sides of the washer 29 by the plates 25 and 28 may be altered to vary through wide limits the torque which it is possible for the body of the rotor to exert upon the shaft 6. When the retarding force exerted upon the shaft 6 is suddenly increased by stoppage of the machinery driven, through accident or otherwise, the only shock produced will be that due to the momentum of the machinery itself, and the shaft of the rotor, as the yielding connection between the shaft and the rotor body will allow the latter to turn on the shaft.

It will be observed that with the construction disclosed the yielding connection of the body and shaft is made a part of the motor structure, and is located in a protected position where it does not increase the exterior dimensions of the motor. While the mechanism disclosed is simply constructed, readily assembled, and possesses excellent mechanical properties, it will be readily apparent to those skilled in the art that many changes may be made in the form of my invention without departing from its spirit, and I do not wish the claims hereinafter made to be limited to the particular construction described and illustrated more than is made necessary by the state of the art.

What I claim as new and desire to secure by Letters Patent of the United States, is,—

1. A dynamo electric machine comprising a shaft, a sleeve rotatably mounted thereon, a core comprising end members secured to said sleeve and punchings assembled between said end members, said core having axially extending channels formed in it, a friction member longitudinally slidable but non-rotatably mounted on said sleeve, a coöperating friction member secured to the shaft, and helical springs located in said channels, one end of each spring engaging the friction member mounted on the sleeve, and means engaging one of said end members for regulating the tension of said springs.

2. In combination, a shaft, a sleeve rotatably mounted thereon, a core comprising end members secured to said sleeve and punchings assembled between said end members, said core having axially extending channels formed in it, a friction member longitudinally slidable but non-rotatably mounted on said sleeve, a coöperating friction member secured to the shaft, and helical springs located in said channels one end of each spring engaging the friction member mounted on the sleeve, and means for regulating the tension of said springs, comprising bolts in threaded engagement with one of the end members, one end of each bolt engaging one end of each spring.

3. In combination, a shaft, a core comprising end members rotatably mounted on said shaft and punchings assembled between said end members, said core having axially extending channels formed in it, means for preventing axial movement of the core relative to the shaft, a friction member axially but not rotatably movable with respect to said core, a coöperating friction member secured to the shaft, and helical springs located in said channels, one end of each spring engaging the friction member secured to the core, and means for regulating the tension of each spring comprising a bolt in threaded engagement with one of the end members, one end of which engages one spring.

In witness whereof, I have hereunto set my hand this fourth day of December, 1905.

JOHN B. WIARD.

Witnesses:
 JOHN A. McMANUS, Jr.,
 HENRY O. WESTENDARP.